United States Patent [19]

Propst

[11] 4,052,084
[45] Oct. 4, 1977

[54] MATERIAL HANDLING APPARATUS
[75] Inventor: Robert L. Propst, Ann Arbor, Mich.
[73] Assignee: Herman Miller, Inc., Zeeland, Mich.
[21] Appl. No.: 672,658
[22] Filed: Apr. 1, 1976
[51] Int. Cl.² ............................................. B62D 21/00
[52] U.S. Cl. .................................. 280/408; 211/126; 280/43.12
[58] Field of Search ............... 108/55.1, 901; 211/126; 312/283, 287, 257 R, 323; 280/43.12, 79.1, 79.2, 79.3, 33.99 T, 408; 296/35 A

[56] References Cited
U.S. PATENT DOCUMENTS

| | | | |
|---|---|---|---|
| 1,522,707 | 1/1925 | Andrews | 108/55.1 X |
| 2,676,029 | 4/1954 | Hutchinson | 280/408 X |
| 3,321,258 | 5/1967 | MacKay | 312/287 X |
| 3,698,565 | 10/1972 | Weber | 211/126 X |
| 3,908,831 | 9/1975 | Brendgord | 211/126 X |
| 3,966,221 | 6/1976 | Beam | 280/79.3 |

*Primary Examiner*—Joseph F. Peters, Jr.
*Assistant Examiner*—R. Schrecengost
*Attorney, Agent, or Firm*—Olsen and Stephenson

[57] ABSTRACT

A pallet supporting a plurality of containers in which small workpieces can be stored. The pallet consists of a base having supporting legs and an upright container supporting wall. Horizontally extending rails are arranged on the wall in vertically spaced pairs and the containers are slidably suspended on the rails so that they can readily be unloaded from the pallet. A security cover is provided which can be mounted on the pallet so as to enclose the containers supported thereon. The pallet of this invention is incorporated into a material handling system which includes a plurality of transport carts adapted to be hitched together for movement of a plurality of pallets between locations. Each transport cart is provided with spaced apart leg wells on which the pallet is placed and an access space is thereby provided beneath the base of the pallet to facilitate the placement and removal of the pallet on the transport cart.

5 Claims, 14 Drawing Figures

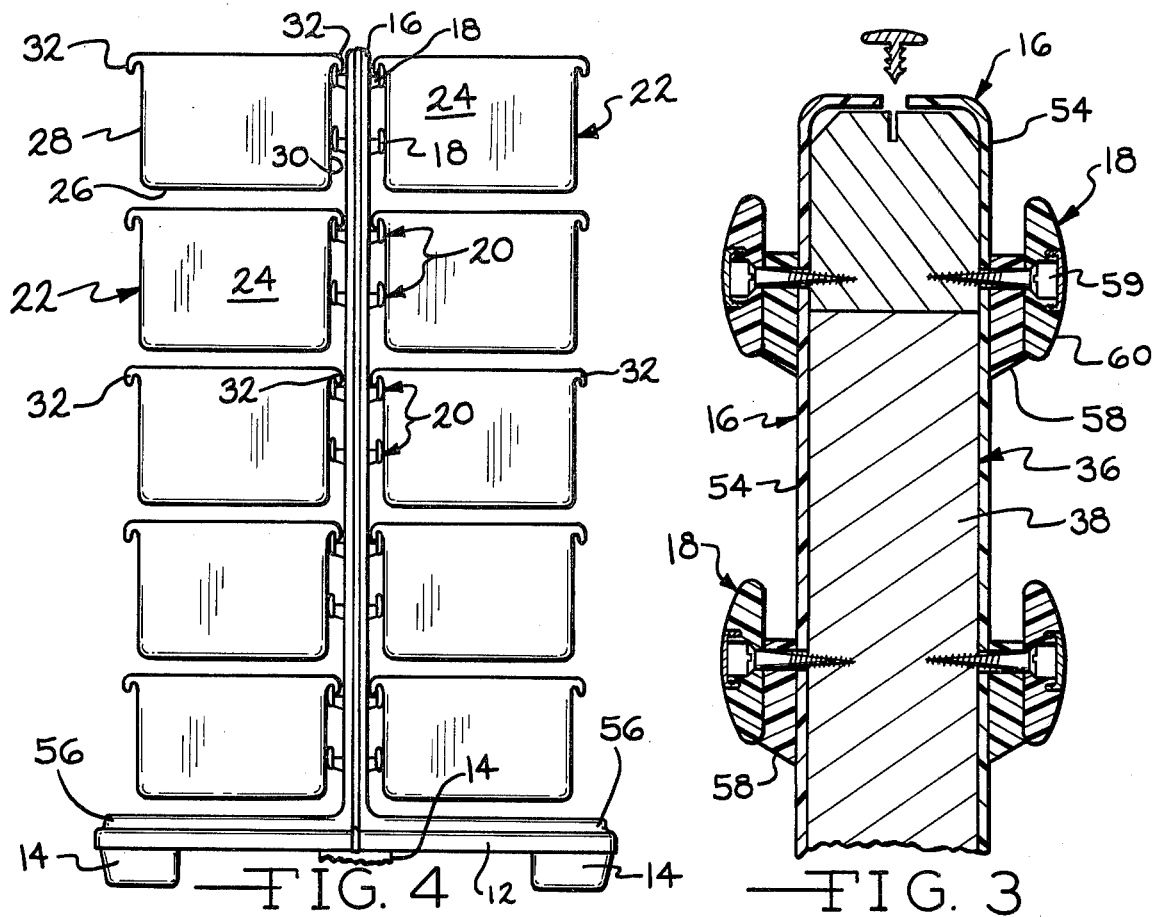
FIG. 4
FIG. 3
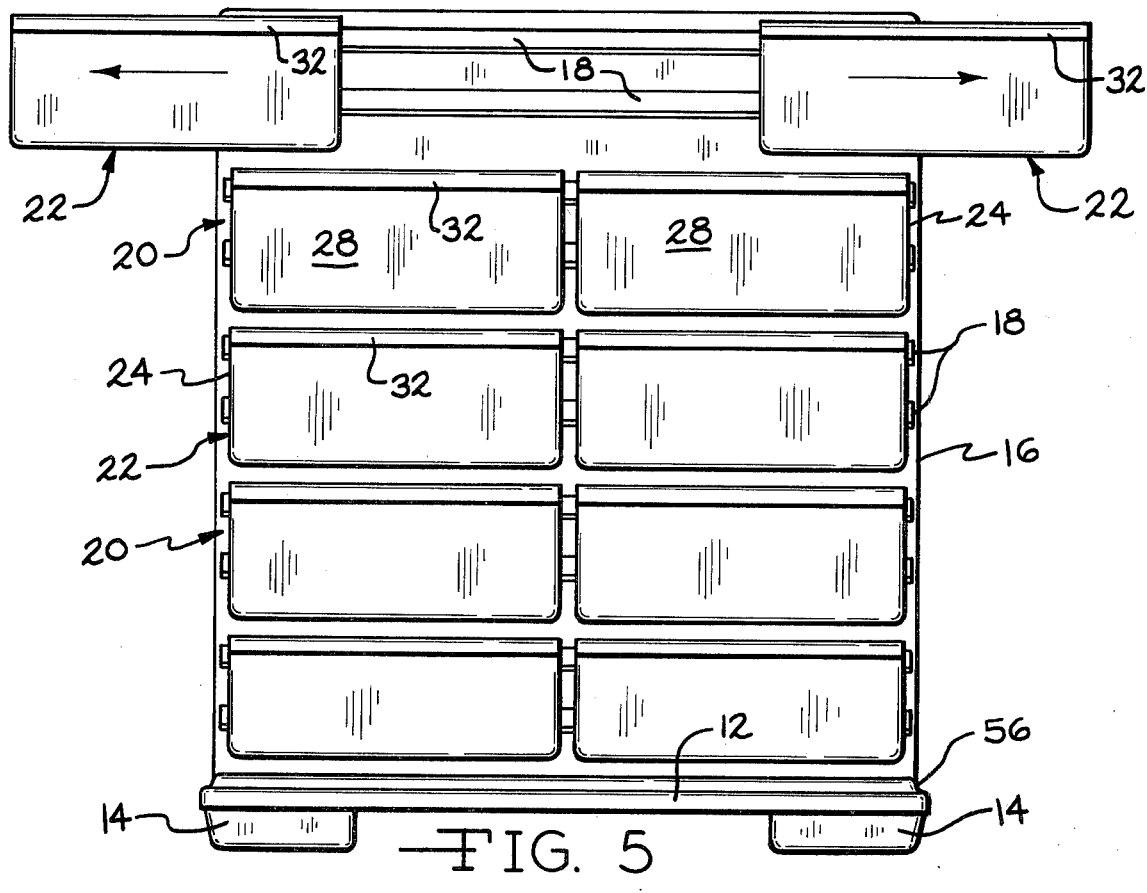
FIG. 5

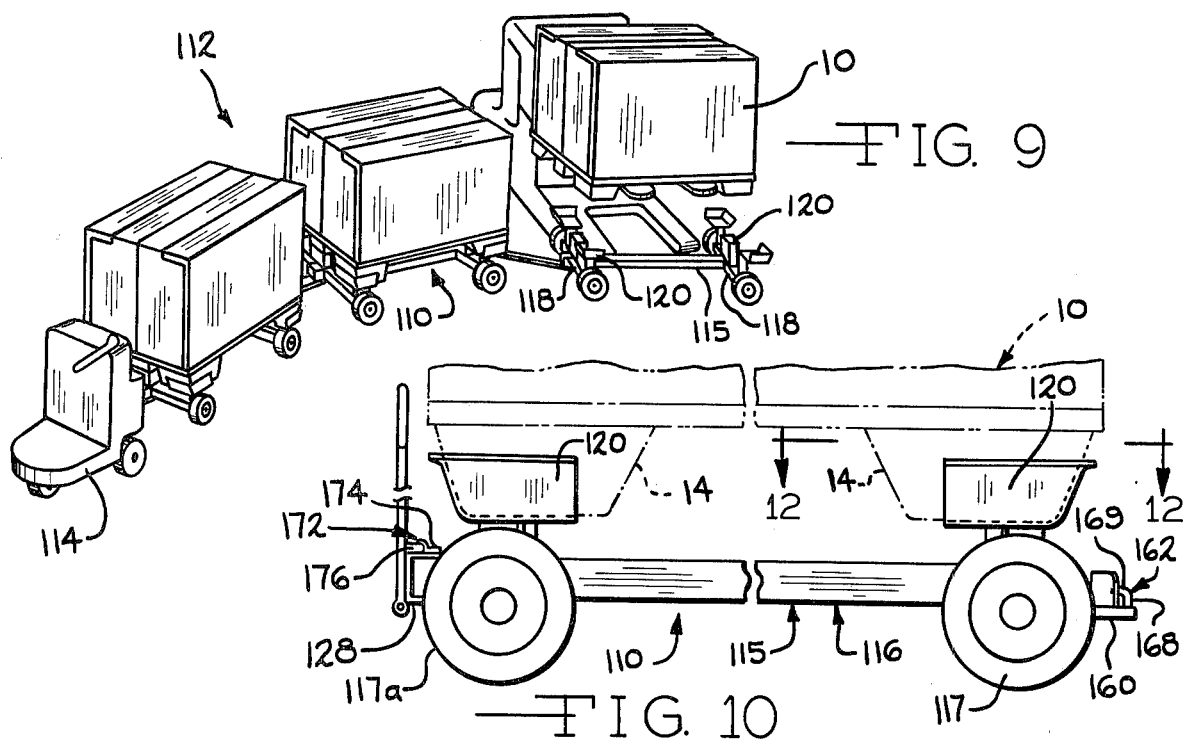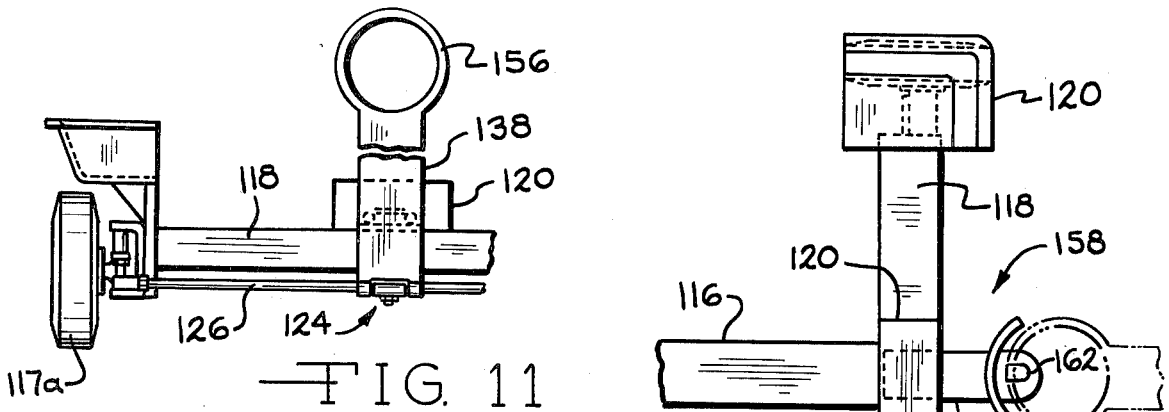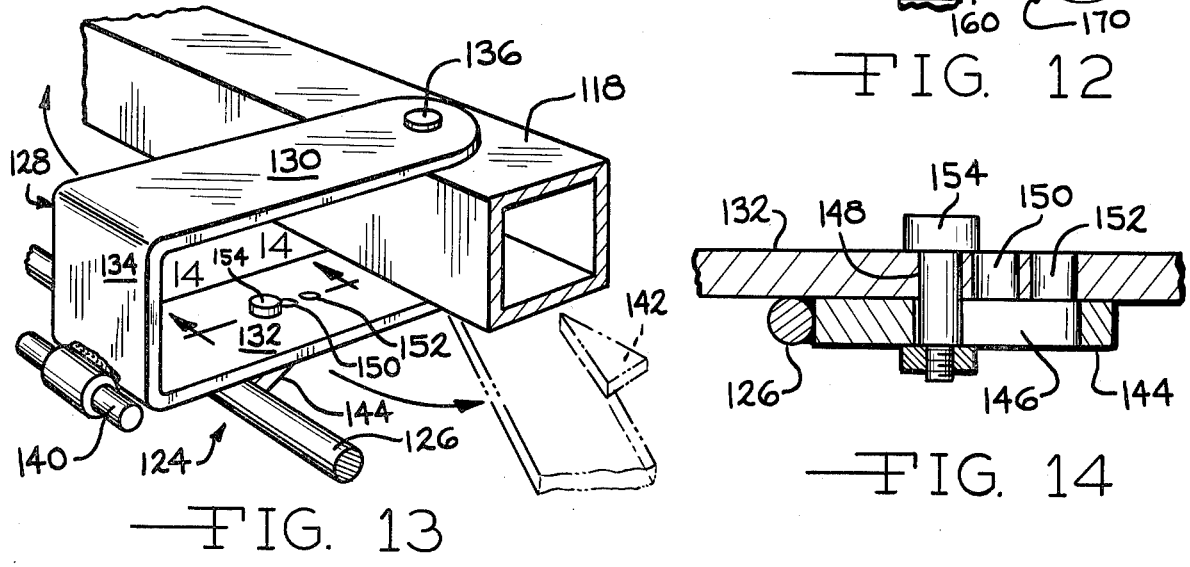

MATERIAL HANDLING APPARATUS

BACKGROUND OF THE INVENTION

This invention relates generally to material handling apparatus and more specifically to a pallet adapted to transport a plurality of containers for small workpieces. In the past, material handling needs have been met by combining many unrelated products and components into systems. The results have usually been unsatisfactory, with many resulting problems.

For example, past systems have had an inadequate interface between containers, storage facilities, and transport apparatus resulting in inefficiency and poor handling characteristics. This has required excessive transfer actions and movement from one handling mode to another. Furthermore, prior art systems have lacked human factor considerations and have involved too many manual handling characteristics. Also, past systems have usually had inadequate security characteristics.

It is an object of the present invention, therefore, to provide improved material handling apparatus consisting of a special pallet and containers constructed particularly for removable support on the pallet to thus enable efficient and convenient storage and transporting of various small parts in a modular fashion.

SUMMARY OF THE INVENTION

The present invention overcomes the deficiencies of the prior art by providing a pallet which supports a plurality of detachably mounted containers that in turn hold a plurality of small workpieces. Each container is of open top construction, is readily stacked on another container and can be mounted on and removed from the pallet without moving any other container. This enables the use of the pallet and containers into a material handling system in which there is a coherent interface between container and transporter.

The pallet of this invention comprises a base having six support legs which provide a gap between the underside of the base and the floor to enable a forklift truck to hoist the pallet and move it from one location to another. An upright wall on the base has a plurality of horizontal rails secured to each side of the wall to provide supports for the containers.

Flanges on the containers interfit with the rails so as to provide for a slidable support of the containers on the pallet wall thereby enabling ready removal of containers from the pallet. The pallet can in turn be handled as a unit for storage and transportation purposes.

The pallet is constructed so that a security cover can readily be mounted thereon to enclose the pallet wall and the containers hung thereupon to protect the workpieces in the containers from unauthorized appropriation. In addition, the security cover and the pallet form a box-like structure which enables the pallets to be stacked one upon the other for storage or transportation.

The pallet can be moved between desired locations by a transport cart which can be hitched to other carts for towing a plurality of pallets between desired locations. Each transport cart has a steering assembly, a frame and leg wells which support the pallet above the frame. An access space is thus formed between the underside of the base of the pallet and the cart frame to allow a forklift truck to easily place and remove the pallet on and from the transport cart.

The pallet, containers, security cover and transport cart of this invention provide apparatus for efficiently and conveniently storing and transporting small parts in a modular fashion.

Further objects, features and advantages of this invention will become apparent from the following description, the appended claims and the accompanying drawing, in which:

FIG. 3 is a detail sectional view of an upper portion of the container supporting wall in the pallet of this invention;

FIG. 4 is a side view of the pallet with a plurality of containers supported thereupon;

FIG. 5 is a front view of the pallet shown in FIG. 4;

FIG. 9 is a perspective view showing the pallet of the present invention incorporated into a material handling transportation system;

FIG. 10 is a side elevation view of a transport cart;

FIG. 11 is a fragmentary front view of a transport cart showing its steering mechanism;

FIG. 12 is a fragmentary top view of the transport cart taken substantially from the line 12-12 in FIG. 10;

FIG. 13 is a perspective view of a portion of the steering mechanism of the transport cart shown in FIG. 11; and FIG. 14 is a sectional view of the steering mechanism taken substantially from line 14—14 in FIG. 13.

Figure 1:
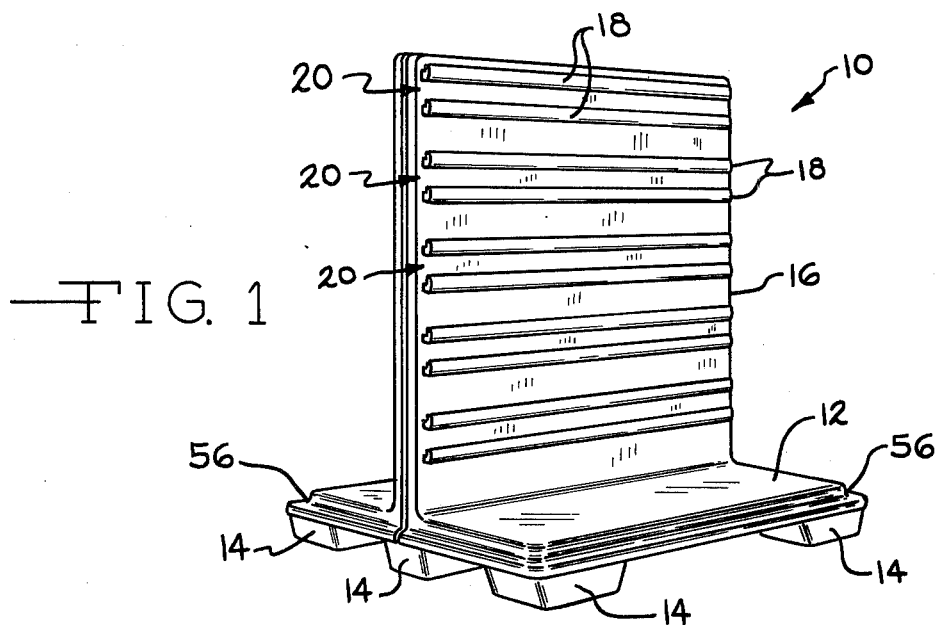
FIG. 1 is a perspective view of the pallet of this invention.

Referring to the drawing, the pallet of this invention, indicated generally at 10, is shown in FIG. 1 as comprising a generally rectangular base 12 having downwardly extending support legs 14 at each corner of the base 12 and at the ends of the base 12 intermediate the corner legs 14. The provision of the legs 14 enable the fork on a conventional forklift truck to be engaged with the underside of the base 12 for pallet transportation purposes. An upright wall or frame 16 on the base 12 extends from end to end of the base midway between the base sides. A plurality of support rails 18 for containers 22 are longitudinally mounted on each side of the pallet wall 16 and, as seen in FIG. 1 and FIG. 4, the rails 18 are arranged on the wall 16 in a plurality of associated pairs 20, each pair being capable of supporting a horizontally extending row of containers 22. Each pair 20 of the rails 18 is mounted in a vertically spaced relation with the other pairs 20 of the rails 18. As seen in FIG. 4, the rails 18 in each pair 20 are affixed to the wall 16 so that the distance therebetween is less than the height of the container 22 supported thereon for a purpose to appear presently.

The containers 22 are of the conventional open top box-type and can be formed of any suitable material such as plastic. Each container 22 has a pair of side walls 24, a front wall 28, a bottom wall 26 and a back wall 30. A flange 32 is attached to the upper edge of each front wall 28 and each back wall 30 and is operable to engage the support rail 18 on which the container 22 is supported. As see in in FIGS. 4 and 5, eand flange 32 projects outwardly and then downwardly from the upper edge of the container so that the flange forms a downwardly facing hook which can interfit with a rail 18 as will be described more in detail hereinafter.

Figure 2:
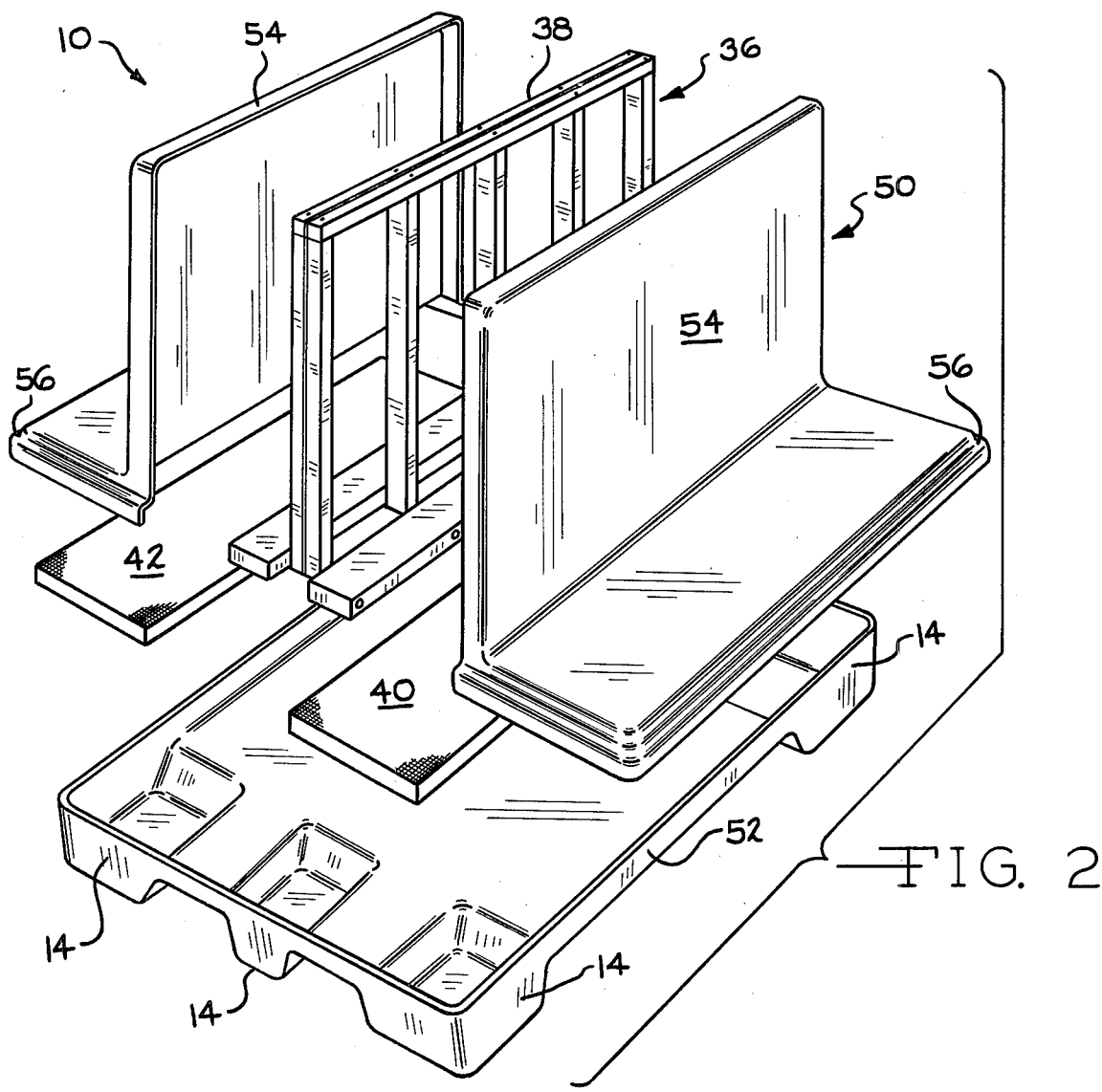
FIG. 2 is an exploded perspective view of the pallet showing its inner frame structure.

The construction of the pallet 10(FIG. 2) is such that it has an inner skeleton frame 36 covered by an outer shell 50. The inner frame 36 has an upright wall portion 38 and base portions 40 and 42 whichprovide strength for the pallet 10.

The outer shell 50 is formed generally to the inverted T-shaped configuration of the inner frame 36 and comprises a bottom section 52 which forms the legs 14 and supports the frame 36 and a pair of L-shaped sections 54 which are located on top of the bottom section 52 and cover the frame 36. The sections 52 and 54 are made from high strength plastic and are suitably secured to each other and to the frame 36. A groove 56 (FIGS. 1 and 2) is formed around the periphery of the base 12 in the sections 54 for a purpose to appear presently.

As best appears in FIG. 3, each rail 18 comprises an elongated horizontal rib 58 and a bar 60 secured to the outer face of and extending upwardly above the rib 58. Each rib 58 and its associated bar 60 is secured to the wall 16 by screws 59 which extend through the outer shell 50 and into the inner frame 36. The screws 59 thus also function to secure the outer shell members 54 to the frame 36. Each rib 58 and its bar 60 cooperate to form a rail 18 which extends outwardly from the wall 16 and then upwardly. Each rail 18 is thus of upwardly facing hook shape so that it will interfit with the flanges 32 of the containers 22. Thus, the containers 22 can either be lowered onto or raised off the rails 18 or they can be slid lengthwise on and off the rails 18 (FIG. 5) to provide flexibility in handling of containers 22.

Figure 6:
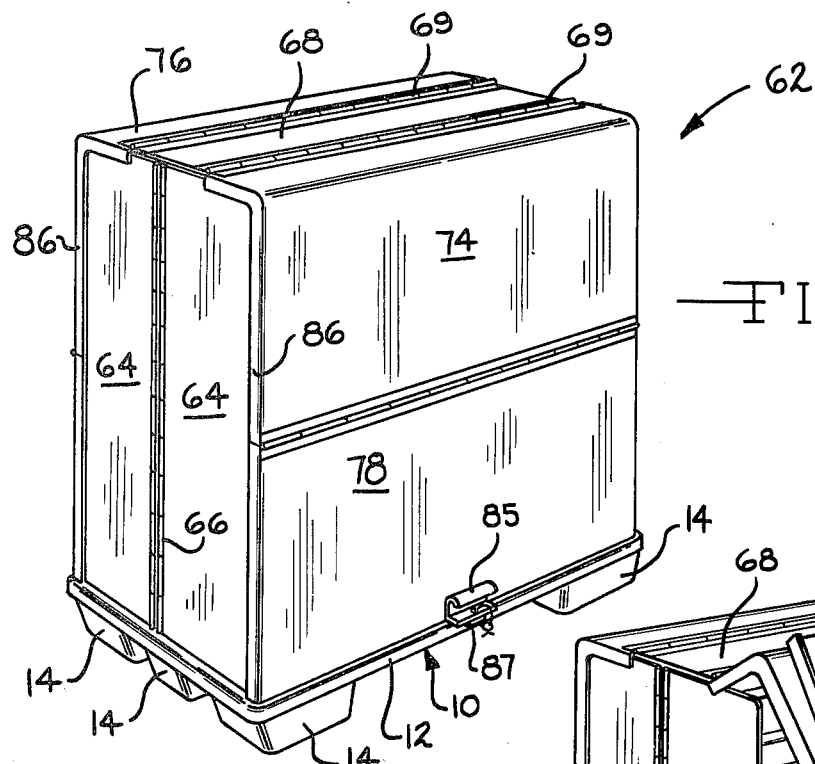
FIG. 6 is a perspective view of the pallet of FIG. 1 with a security cover mounted thereon, showing the cover in closed position.
Figure 7:
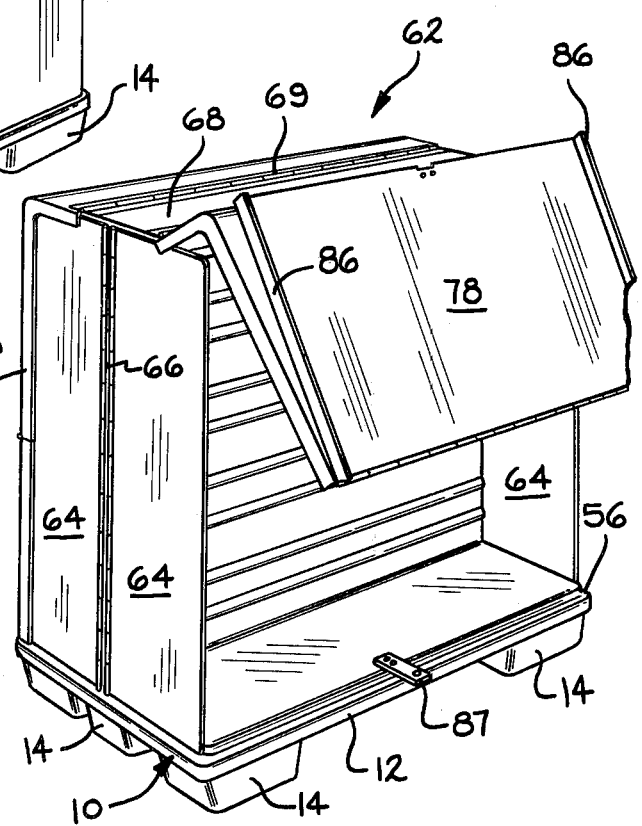
FIGS. 7 and 8 are views, like FIG. 6, showing the cover in partially open and fully open positions, respectively.
Figure 8:
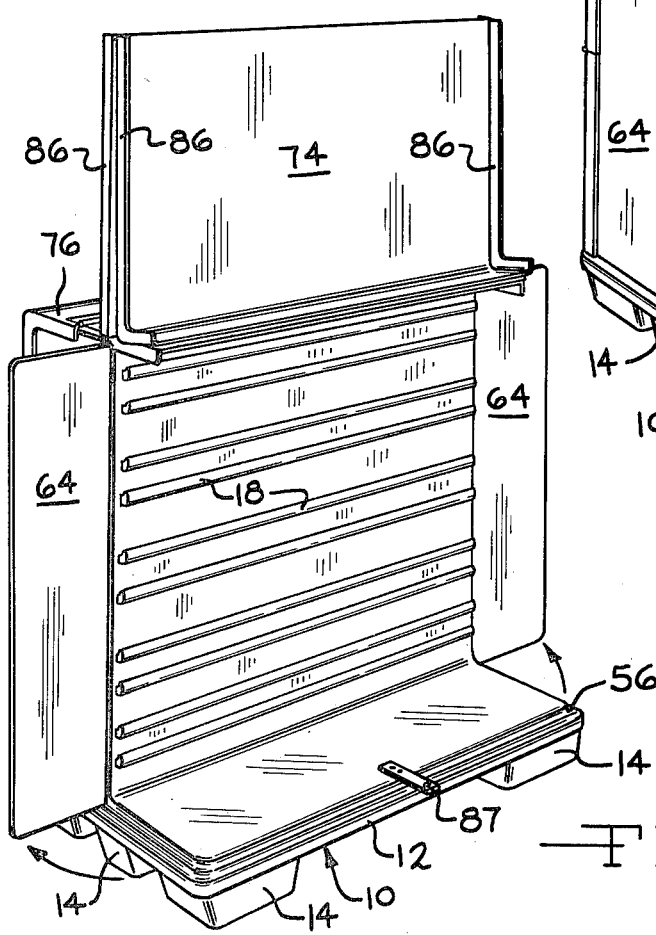

FIGS. 6-8, inclusive, illustrate the assembly of a security cover 62 with the pallet 10. The cover 62 can be used when it is desired to enclose and limit access to containers 22 on the pallet 10. The security cover 62 comprises two pairs of side panels 64, the panels 64 in each pair being connected to opposite sides of a hinge 66. The panels 64 can be swung to the open positions shown in FIG. 8 to enable the containers 22 to be slid horizontally on and off the rails 18 as shown in FIG. 5. A top panel 68 is connected to the hinges 66 and supports a pair of hinges 69 secured to opposite edges of the top panel 68. Hinged panels 74 and 76 are attached to the top hinges 69 to enable the opening of the security cover in a relatively confined area.

Rim members 86 are secured along the edges of the door panels 74 and 78 so that they overlap the side panels 64 when the security cover 62 is closed. Thus, the door panels 74 and 78 must be swung open before the side panels 64 can be opened to allow the containers 22 to be slidably removed from the rails 18.

The groove 56 in the base 12 provides a continuous abutment surface against which the security cover 62 can be engaged when the cover 62 is manipulated to enclose containers 22 on the pallet 10.

Locking brackets 85 and 87 secured to the security cover panel 78 and the base 12, respectively, enable the cover 62 to be locked to the base 12. Since the security cover 62 has a flat top, a plurality of covered pallets 10 can be stacked on one another during storage or transportation.

The pallet 10 of this invention can be incorporated into a material handling system which is efficient, effective and which ultimately reduces the cost of manufacturing goods. The containers 22 can be stacked at the work stations where small components are being produced; after each container 22 is filled with the parts it can be supported on the wall 16 in a pallet 10. Each container 22 has one of its flanges 32 hooked over the upper rail 18 in a pair 20. The container is then allowed to hang from the upper rail 18 with its rear wall 30 abutted against the lower rail 18. This arrangement insures an upright un-tipped position of each container 22 on the wall 16 enabling easy sliding of the containers on the rails 18.

The containers 22 can either be lowered onto the rails 18 or they can be slid endwise onto any rail 18 without regard to any other containers 22 that may be hung on the pallet wall 16.

As seen in FIGS. 4 and 5, the pallet 10 in the present invention is adapted to hold twenty containers 22, ten on each side of the pallet wall 16. The containers 22 are arranged in a pair of vertical rows so that each container 22 can be removed without moving any other container 22.

The security cover 62 (FIGS. 6-8) is particularly suited for protecting the workpieces that are stored on the pallet 10. When the cover doors are open, as shown in FIG. 8, the containers 22 can be hung on the pallet wall 16 by laterally sliding them onto the rails 18 or by lowering them so that the flange 32 of each container engages the rail 18. When the security cover 62 is closed, its flat top can serve as a support for another pallet 10 so that a number of pallets can be stacked one on top of the other for storage or transportation.

A plurality of pallets 10 can be incorporated into an integrated material handling system which includes a plurality of transports carts 110 adapted to be hitched together to form a train 112 that is propelled between locations by an industrial truck 114 (FIG. 9). Each transport cart 110, FIGS. 9-14, consists of a frame 115 mounted on the four wheels 117 and formed to a generally H-shaped configuration having a central frame member 116 and a pair of cross members 118 that are secured to opposite ends of the central frame member 116. The front wheels 117a are pivotally mounted on the frame 115 so that the cart 110 can be guided along curved paths. Six leg wells 120 are secured to the frame 115 and function as supports for the pallet 10. The positions of the leg wells 120 conform substantially to the positions of the legs 15 of the pallet 10 to provide aligned positioning of the pallet 10 on the transport cart 110.

The leg wells 120 are located above the frame 115 so that an access space between the underside of the base 12 of the pallet 10 and the frame 115 is established which allows easy placement and removal of the pallet 10 on and from the cart 110, respectively. Access to the pallet 10 can thus be made from any side of the cart 110.

Each cart 110 is provided with a steering mechanism 124 which enables the cart 110 to be guided along curved paths. The steering mechanism 124 (FIGS. 11 and 13) consists of a tie rod 126 which connects the pivotally mounted front wheels 117a for concurrent pivoting of the front wheels 117a. The tie rod 126 is slidably mounted to a steering member 128 which is pivotally mounted to the front cross member 118 and which functions to control the movement of the cart 110. The steering member 128 is formed to a generally C-shaped configuration having transverse portions 130 and 132 extending from an upright portion 134. The steering member 128 is mounted so that the transverse portions 130 and 132 straddle the front cross member 118. A bolt 136 pivotally secures the steering member 128 to the cross member 118. A tongue 138 is pivotally hinged by the hinge pin 140 to the upright portion 134 of the steering member 128 and can be pivotally moved between a generally horizontal position and an upright position. The pivotal movement of the member 128 is limited by a pair of stops 142 (one shown) which are secured to the underside of the front cross member 118.

The tie rod 126 has a centrally secured plate 144 which is provided with a forwardly extending slot 146. The extension 132 is provided with openings 148, 150 and 152 which are aligned with the slot 146. A bolt assembly 154 extends through one of the holes 148-152 and through the slot 146 and functions to limit the pivotal movement of the steering member 128 and the wheels 117a to thus control the turning radius of the cart 110. As the steering member 128 is pivoted, the bolt 154 will move toward the rear of the slot 146 in plate 144 as it transforms the pivotal movement of the steering member 128 to the linear movement of the tie rod 126 to thus pivot the front wheels 117a. Thus, if the bolt 154 is placed in the hole 152, the pivotal movement of the member 128 will be limited to a greater amount than if the bolt 154 was positioned in the hold 148.

Each transport cart 10 is adapted to be hitched together in a train for movement of a plurality of pallets 10 by the industrial truck 114. Each tongue 138 has at its free end an integrally formed ring 156 which hitches to other transport carts 110. A hitch assembly 158 includes a plate 160 which is suitably secured to the rear cross member 118 of each cart 110. A hook 162 having a shank 168 and a forwardly extending portion 169 is secured to the plate 160 and functions to provide a catch for the ring 156 of the following cart 110. When a plurality of carts 110 are hitched together, the hook 162 prevents the tongue 138 from being disengaged from the hitch assembly 158 of the preceeding cart 110 during movement of the train 112 between locations. A curved barrier 170 is also secured to the plate 160 at a location forwardly of the hook 162 and serves to provide a stop against which the ring 156 of the tongue of the following cart 110 engages when the train 112 is brought to a stop.

The tongue 138 can be maintained in the upright position as shown in FIGS. 10 and 11 by the clip assembly 172. A flexible clip 174 is secured to the transverse cross portion 130 of the steering member 128 and engages a pin 176 which is secured to the tongue 138 to thus maintain the tongue 138 in the upright position when the cart 110 is not being used.

The pallet 10 if this invention has the capability of supporting considerable weight on its upright wall 16. Two of the legs 14 are positioned in alignment with the wall 16 at the opposite ends of the base 12 to provide support for the areas of the pallet 10 where the greatest downward forces are concentrated; that is, directly under the wall 16. The legs 14 are positioned and dimensioned so that spaces are provided for a forklift truck to engage the underside of the base 12 from any side or end of the pallet 10, thus affording flexibility in moving the pallet 10 between locations.

It can thus be seen that a pallet 10 is provided which can be integrated into a material handling system so that the system is efficient and saves material handling costs. The system utilizes the containers 22 to handle small components and each container can hang on rails 18 secured to an upright pallet wall 16. The containers 22 can be removed from the pallet wall 16 without lifting or moving other containers on the pallet 10. An assortment of different small parts can be stored on a single pallet 10 in different containers 22 if desired.

What is claimed:

1. A pallet comprising a generally rectangular base having a plurality of spaced apart support legs extending downwardly from the corners thereof and an additional pair of support legs at the ends of the base intermediate the corner legs, an upwardly extending frame mounted on said base at a position in substantially vertical alignment with said pair of support legs, and means on horizontally opposite sides of said frame for detachably hanging a plurality of containers thereon, said hanging means comprising a plurality of generally horizontally extending vertically spaced support rails, each of said rails projecting transversely of said frame so as to provide a support on which a plurality on containers can be hung, and plurality of load carrying containers having side walls and open upper ends mounted on said rails on opposite sides of said upwardly extending frame, each of said containers having an outwardly and thence downwardly extending flange at said upper end thereof, each of said containers being supported on said rails by having the flange thereon hooked over and slidably supported on one of said rails with one side wall of said container engaging the rail immediately below said one rail to enable sliding movement of said containers on said rails.

2. Apparatus according to claim 1 wherein said pallet comprises an inner support frame, and an outer shell secured to said inner support frame, said inner support frame including a base support portion, and a frame support portion extending upwardly from said base support portion, said outer shell being generally formed to the configuration of said support frame.

3. Apparatus according to claim 1 further including a security cover, said security cover cooperating with said base to enclose said plurality of containers hung on said pallet, said security cover including a plurality of swingable panels, said panels being adapted to swing open to enable sad containers to be slidably moved longitudinally on said rails, said panels including a plurality of swingable side panels and a plurality of swingable door panels, each of said door panels having a rim formed about its outer periphery, said rim being operable to overlap said side panels when said security cover is closed to thereby hold said side panels in closed positions.

4. Apparatus according to claim 1 further including a transport cart having a frame mounted on a plurality of wheels for movement between locations, steering means operatively associated with at least one of said wheels for guiding said cart, and leg receptacle means on said cart supporting the legs on said pallet so that said pallet is located on said cart in a position providing an access space between said pallet base and said cart frame to thereby facilitate the placement on and removal from said cart of said pallet.

5. Apparatus according to claim 4 further including hitch means on said transport cart enabling connection of said transport cart to other similar transport carts to form a train for moving a plurality of pallets between locations.

* * * * *